United States Patent
Topping

(10) Patent No.: US 8,919,041 B2
(45) Date of Patent: Dec. 30, 2014

(54) LIGHTING SYSTEM FOR USE IN RAISED BED GARDENING OR LANDSCAPING

(71) Applicant: VegHerb, LLC, Port Chester, NY (US)

(72) Inventor: Anthony Topping, White Plains, NY (US)

(73) Assignee: Vegherb, LLC, Port Chester, NY (US)

(*) Notice: Subject to any disclaimer, the term of this patent is extended or adjusted under 35 U.S.C. 154(b) by 0 days.

(21) Appl. No.: 13/760,662

(22) Filed: Feb. 6, 2013

(65) Prior Publication Data

US 2013/0205663 A1 Aug. 15, 2013

Related U.S. Application Data

(60) Provisional application No. 61/597,005, filed on Feb. 9, 2012.

(51) Int. Cl.
*A01G 9/20* (2006.01)

(52) U.S. Cl.
CPC .................................... *A01G 9/20* (2013.01)
USPC ............................... 47/66.6; 47/58.1 LS

(58) Field of Classification Search
CPC .................................. A01G 9/20; A01G 9/24
USPC ........... 47/1.01 R, 17, 18, 19.2, 20.1, 58.1 R, 47/58.1 LS, 66.1, 66.7, 79; 362/84, 147, 362/154, 249.01, 249.02, 249.03, 249.05, 362/249.07, 253, 40, 4, 407, 409, 805; 135/99

See application file for complete search history.

(56) References Cited

U.S. PATENT DOCUMENTS

| | | | | |
|---|---|---|---|---|
| 1,617,028 | A * | 2/1927 | Rekar | 248/323 |
| 4,869,018 | A * | 9/1989 | Scales et al. | 47/33 |
| 6,434,882 | B1 * | 8/2002 | Becker | 47/19.1 |
| 7,494,254 | B2 * | 2/2009 | Rogers | 362/407 |

* cited by examiner

*Primary Examiner* — Rob Swiatek
*Assistant Examiner* — Ebony Evans
(74) *Attorney, Agent, or Firm* — Leason Ellis LLP

(57) ABSTRACT

A grow light support system for use with a raised border system includes components for forming a tension cord network that is suspended over the raised bed border system and includes a grow light unit that is suspended on the tension cord network. The grow light unit is configured such that the grow light can be positioned and locked in place at a predetermined location of the tension cord network and is configured such that the distance between the grow light and the tension cord network can be varied, thereby changing the height at which the grow light is positioned relative to the ground.

23 Claims, 6 Drawing Sheets

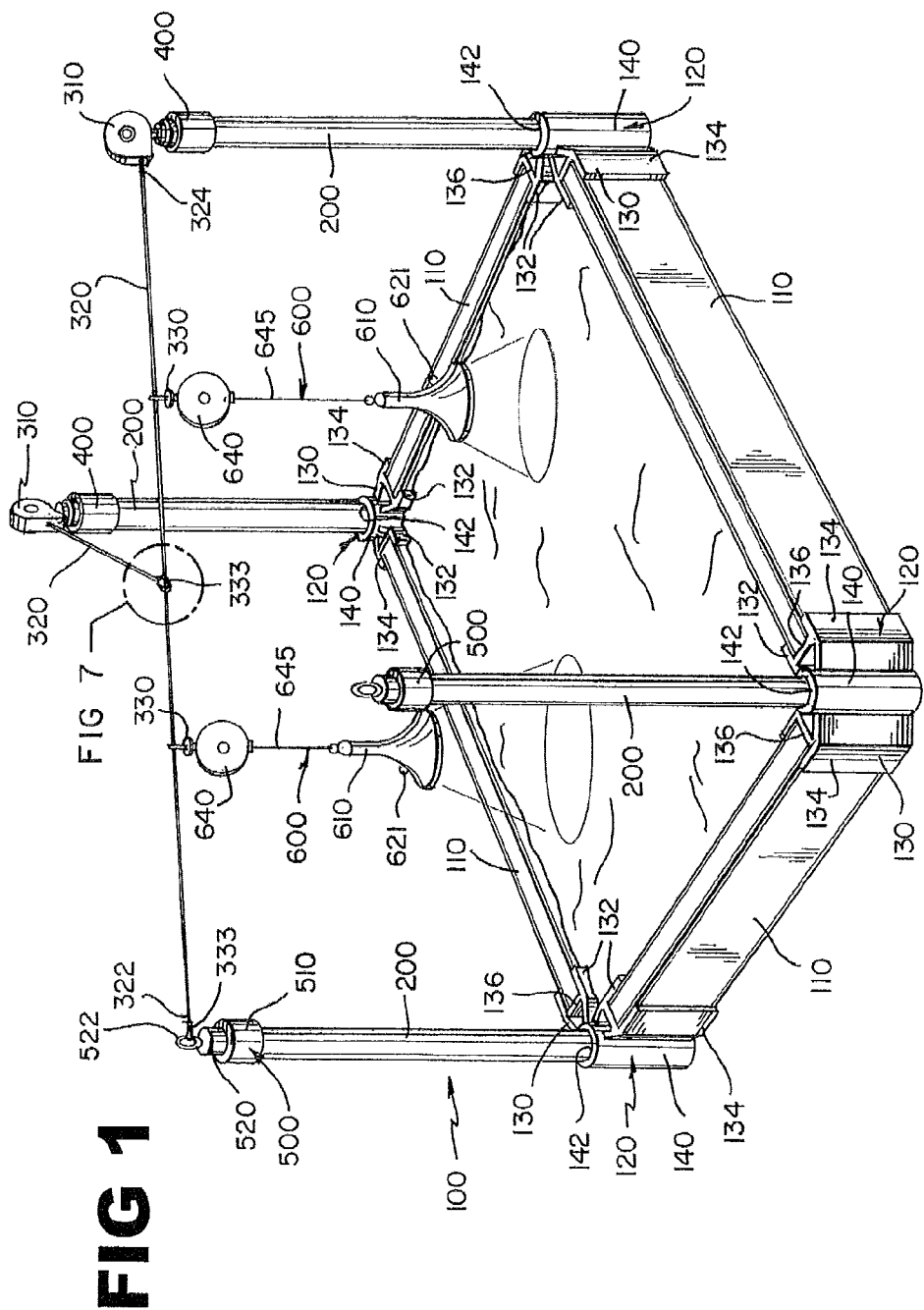

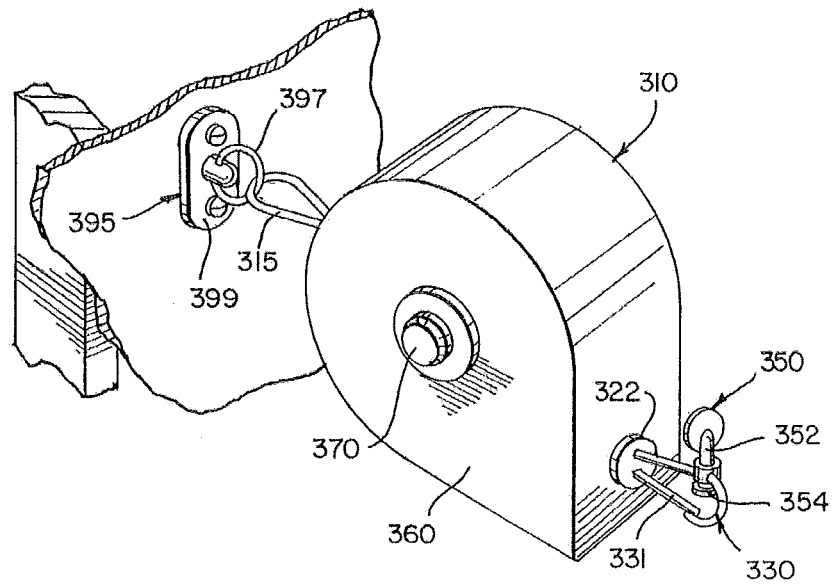
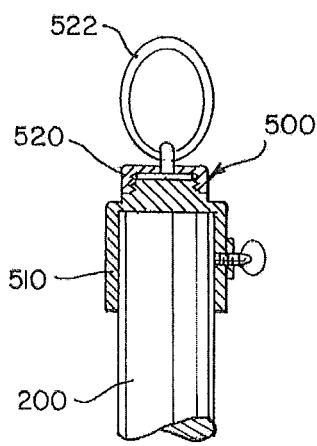
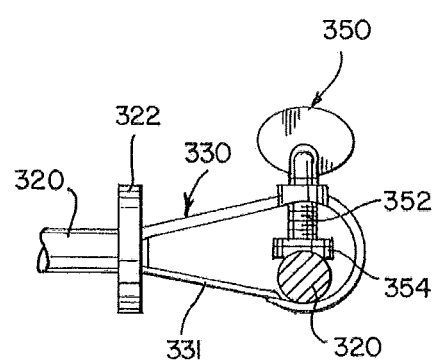

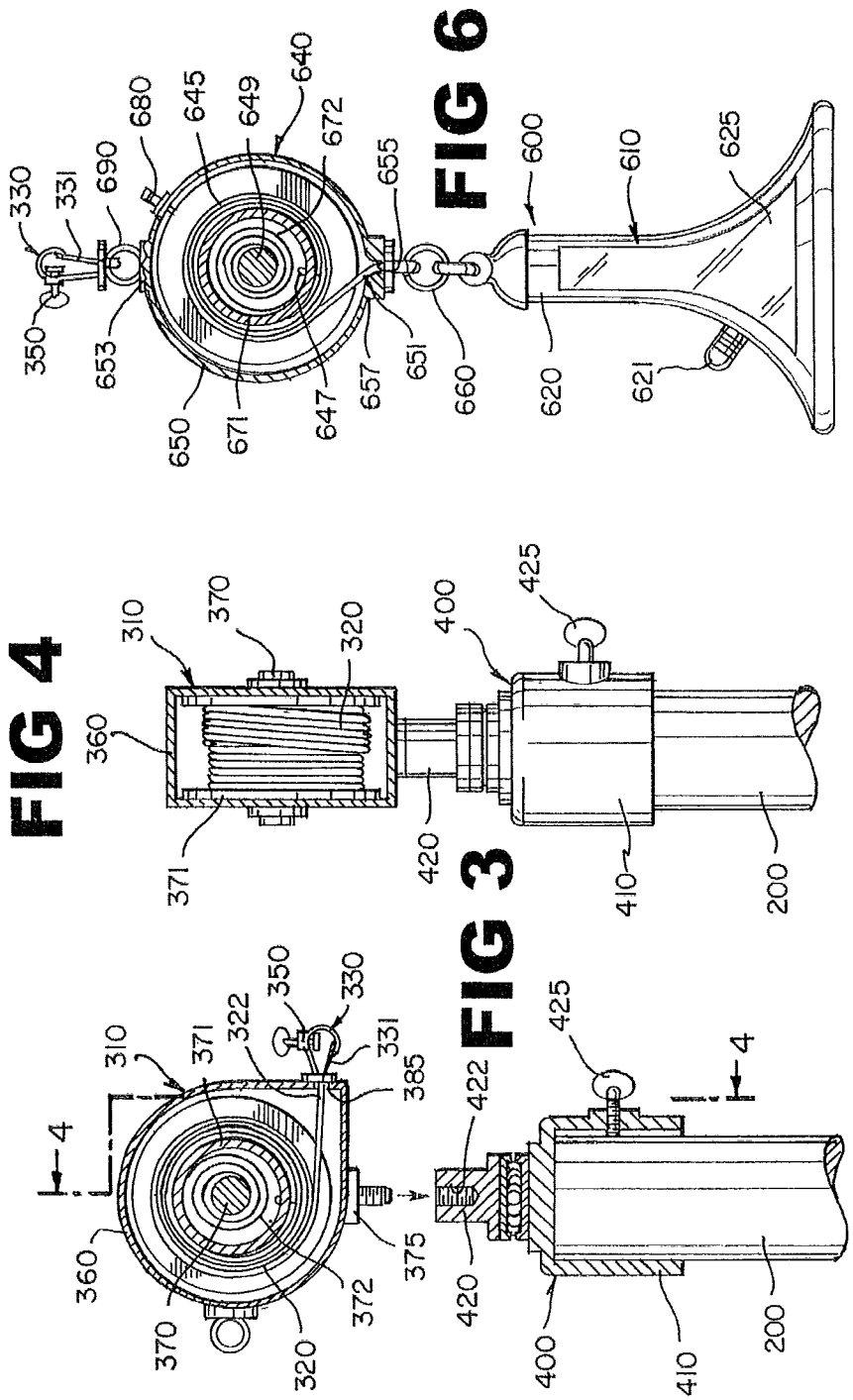

LIGHTING SYSTEM FOR USE IN RAISED BED GARDENING OR LANDSCAPING

CROSS REFERENCE TO RELATED APPLICATIONS

The present application claims priority to U.S. patent application Ser. No. 61/597,005, filed Feb. 9, 2012, which is hereby incorporated by reference in its entirety.

TECHNICAL FIELD

This invention relates to the home gardening and landscape industry, and more particularly, to an accessory device adapted to add adjustable lighting, such as grow lights, to a raised border or landscape edging system.

BACKGROUND

In the home gardening industry, edging systems can be employed to create a border between a garden feature and natural surroundings. A variety of garden features can be defined by an edging system including, without limitation, a flower bed, a vegetable garden, and a sandbox.

Raised bed gardening is a form of gardening in which the soil is formed in a bed having predetermined dimensions, depending in part upon the size limitations of the surrounding space. For example, a raised bed can be in the form of a 3-4 foot (1.0-1.2 m) wide bed, which can be of any length or shape. The soil is raised above the surrounding soil (6 inches to waist high), sometimes enclosed by a frame generally made of wood, rock, or concrete blocks, and enriched with compost or the like. The vegetable plants or flowers are spaced in geometric patterns, much closer together than in conventional row gardening. The spacing is such that when the vegetables are fully grown, their leaves just barely touch each other, creating a microclimate in which moisture is conserved and weed growth suppressed. Raised beds produce a variety of benefits: they extend the planting season; they have better drainage; they reduce the need to use poor native soil; and they can reduce weeds if designed properly. Since the gardener does not walk on the raised beds, the soil is not compacted and the roots have an easier time growing. The close plant spacing and the use of compost generally result in higher yields with raised beds in comparison to conventional row gardening. Waist high raised beds enable the elderly and the sick to grow vegetables without having to bend over to tend them.

One versatile edging system known in the art is described in U.S. Pat. No. 6,202,367 of Marino et al., assigned to the present assignee. The Marino et al. system includes support brackets that receive timber of arbitrary length and stakes of different shapes and sizes. The bracket has a beam receiving portion that receives and fastens to any standard size strip of lumber, including hollow, engineered lumber such as may be constructed as a composite of recycled plastic, wood fiber, rice hulls, resin, in various proportions from zero to a finite amount.

Edging systems, including raised bed gardens, can thus come in a modular set up to make construction easy compared to the conventional manner of making such systems which included cutting wood, etc.

In addition to having the correct soil to promote optimal growing conditions, it will also be appreciated that light conditions are critical in order to achieve optimal growing. Different plants and flowers have different needs in terms of the amount of daily sunlight with some plants requiring full sun and some plants requiring partial sun, etc.

Unfortunately, many times optimal lighting conditions cannot be achieved due to various factors, including the location of the gardening area. For example, it may not be possible due to yard boundaries, house location, etc., to install the edging system (raised garden) at a south facing location.

As a result, supplemental lighting can be used in order to supplement the light source and provide the plants with more optimal growing conditions. A grow light or plant light is an artificial light source, generally an electric light, designed to stimulate plant growth by emitting an electromagnetic spectrum appropriate for photosynthesis. Grow lights are used in applications where there is either no naturally occurring light, or where supplemental light is required. For example, in the winter months when the available hours of daylight may be insufficient for the desired plant growth, grow lights are used to extend the amount of time the plants receive light.

Grow lights either attempt to provide a light spectrum similar to that from the sun, or to provide a spectrum that is more tailored to the needs of the plants being cultivated. Outdoor conditions are mimicked with varying color temperatures and spectral outputs from the grow light, as well as varying the lumen output (intensity) of the lamps. Depending on the type of plant being cultivated, the stage of cultivation (e.g., the germination/vegetative phase or the flowering/fruiting phase), and the photoperiod required by the plants, specific ranges of spectrum, luminous efficacy and color temperature are desirable for use with specific plants and time periods.

Natural daylight has a high color temperature (approx. 6000 K). Visible light color varies according to the weather, and angle of the sun, and specific quantities (measured in Lumens) of light stimulate photosynthesis. Distance from the sun has little effect on seasonal changes in the quality and quantity of light and the resulting plant behavior during those seasons. The Earth tilts on its axis as it revolves around the sun. During the summer we get nearly direct sunlight and during the winter we get sunlight at a 23.44 degree angle to the equator. This small tilt of the Earth's axis changes the effective thickness of the atmosphere with respect to the distance sunlight has to travel to reach our particular area on Earth. The color spectrum of light that the sun sends us does not change, only the quantity (more during the summer and less during winter) and quality of overall light reaching us.

Different stages of plant growth require different spectra. The initial vegetative stage requires blue spectrum of light, whereas the later "flowering" stage is usually done with red-orange spectra. Light bulbs can be manufactured with a specific spectrum range or can be full spectrum. There are number of different suitable light source that can be used as grow lights.

Recent advancements in LEDs allow production of relatively inexpensive, bright, and long-lasting grow lights that emit only the wavelengths of light corresponding to the absorption peaks of a plant's typical photochemical processes. Compared to other types of grow lights, LEDs are attractive to indoor growers since they consume much less electrical power, do not require ballasts, and produce considerably less heat. This allows LEDs to be placed closer to the plant canopy than other lights. Also, plants transpire less, as a result of the reduction in heat, and thus the time between watering cycles is longer. There are multiple absorption peaks for chlorophyll and carotenoids, and LED grow-lights may use one or more LED colors overlapping these peaks. For vegetative growth, blue LEDs are preferred, where the light has a wavelength somewhere in the mid-400 nm. For growing fruits or flowers, a greater proportion of deep-red LEDs is considered preferable, with light very near 660 nm, the exact wavelength number being much more critical than for the blue LED.

Newer advanced LED grow lights are constructed to use high-brightness multiple-watt LEDs, with growing results similar to HID lights. Grow light LEDs are increasing in power consumption resulting in increased effectiveness of the technology. LEDs used in previous designs were 1 watt in power, however 3 watt and even 5 watt LEDs are now commonly used in LED grow lights. LED grow lights are now being produced which exceed 600 watts.

Since ideal light conditions may not be present at many locations, including both indoor and outdoor settings, there is a need to have a supplemental lighting system that permits a supplemental light system to be added as an accessory to an edging system.

SUMMARY

According to one exemplary embodiment, a grow light system for use in a raised bed arrangement that includes a frame having a plurality of side wall parts mated together with coupling members. The grow light system includes a plurality of vertical support members configured to mate with the coupling members resulting in the vertical support members being upstanding members. The system further includes at least one first tension cord device that includes a housing which stores a first tension cord that has a biasing force applied thereto and can be extended from the housing and retracted back into the housing due to the applied biasing force. A distal end of the cord includes a first connector and the first tension cord device is configured to mate with and be securely supported by one vertical support member. Extension of the first tension cord and attachment of the first connector to a structure results in the first cord being under tension and suspended over the raised bed arrangement.

The system also includes a grow light unit having a light source contained within a housing and at least one second tension cord device that includes a housing which stores a second cord that has a biasing force applied thereto and can be extended from the housing and retracted back into the housing due to the applied biasing force. The second tension cord device has a mechanism that allows the cord to be placed in a locked position in which a predetermined length of cord extends from the housing. A distal end of the cord is coupled to the housing of the grow light unit. The second tension cord device permits the grow light to be positioned at a predetermined location along the first tension cord at a preselected distance from an object in the raised bed arrangement. The second tension cord device is coupled to the first tension cord such that it is suspended therefrom.

The light source can be in the form of an LED lamp that is powered by a power source and is configured to emit only wavelengths of light corresponding to absorption peaks of a plant's typical photochemical processes. The LED lamp can be constructed such that it includes a solar panel for charging a batter power source and therefore can be used in outdoor locations, such as a raised bed garden or the like and can be exposed to the elements, etc.

Other aspects, features and advantages of the invention will be apparent in view of the accompanying description of certain embodiments thereof when considered in connection with the accompanying drawing figures.

BRIEF DESCRIPTION OF THE DRAWINGS

FIG. 1 is a perspective view of a raised border system showing a lighting system according to one embodiment of the invention;

FIG. 2 is a close-up perspective view of an extendable cord that is configured for attaching to a support surface and is suitable for hanging the lighting system of the present invention;

FIG. 3 is a cross-sectional view of an extendable cord device according to the present invention;

FIG. 4 is a cross-sectional view of the extendable cord device taken along the lines 4-4 of FIG. 3;

FIG. 5 is a cross-sectional view of a cord retaining member according to one embodiment;

FIG. 6 is a cross-sectional view of an extendable lighting unit according to the present invention;

FIG. 7 is a close-up of a cord coupling member according to the other embodiment for attaching an end of one cord to another cord;

DETAILED DESCRIPTION OF CERTAIN EMBODIMENTS

Figure 8:
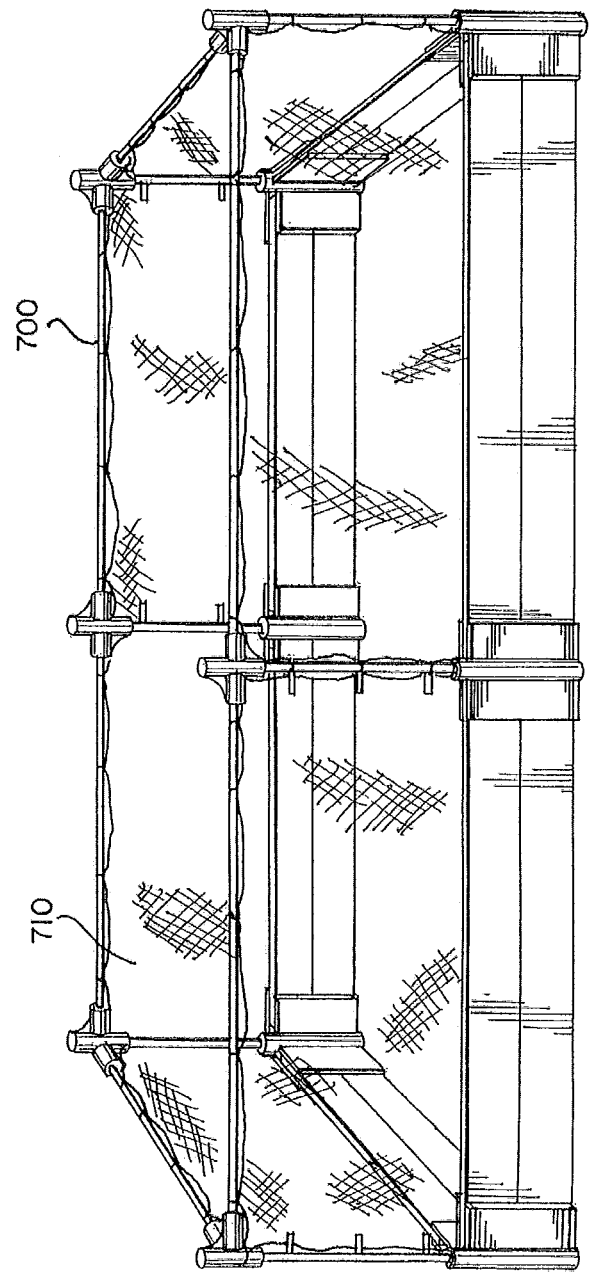
FIGS. 8 and 9 are perspective views of a raised border system having an alternative frame construction and an optional netting.

The invention is described in connection with one embodiment in which it is used in conjunction with a raised border system in which a number of timbers or the like (e.g., fabricated planks) are joined together by support brackets (coupling members), substantially as described in the aforementioned Marino et al. patent, U.S. Pat. No. 6,202,367, the disclosure of which is hereby incorporated by reference as if set forth in its entirety herein. However, it will be appreciated that the accessories of the present invention can be used with other raised border systems and in particular, can be used with modular type raised border systems that are constructed of a number of different components that mate together to form a border. Typically, the raised border systems include a number of different joints or interfaces, such as corners, between side walls, etc.

As shown in FIG. 1, an exemplary raised border system 100 is illustrated and includes a number of different modular components that mate together to form the assembled raised border system 100. The exemplary system 100 includes a plurality of side wall members 110. The side wall members 110 can be in the form of elongated planks or the like that form the side walls of the raised border system.

FIG. 1 shows the basic construction of the frame work and support brackets (coupling members) 120 that mate with and receive the side wall members 110. The support bracket 120 has a beam receiving portion 130 and a mounting column portion 140 for receiving a vertical support member 200. The illustrated support bracket 120 is in the form of a corner support bracket 120. The corner support bracket 120 includes two beam receiving portions 130 and a single mounting column portion 140 between two beam receiving portions 130. The support bracket 120 is not limited to being a corner member and can be used along the side wall at an intermediate location.

The mounting column portion 140 is intended to receive a vertical member, such as a column, that is part of the frame of the raised border system 100. The mounting column portion 140 has a central bore 142 that receives the vertical support member 200. In the illustrated embodiment, the central bore 142 has a circular shape in view of the circular shape of the vertical member (vertical support member 200); however, the bore 142 can come in any number of different shapes, including square, triangular, oval, rectangular, etc.

The beam receiving portion 130 is U-shaped and has a rear rim 132, a front rim 134 and a base 136, which define a channel for receiving a beam of lumber or a synthetic beam or any other elongated beam type structure that forms the side wall of the raised border system 100. The attachment between the side wall member 110 and the support bracket 120 can be any number of different types of attachment means, including different mechanical attachment means. For example, a frictional fit can be formed between the components or a fastener can be used. The attachment means is of a type that allows the side wall member 110 to be removed from the support brackets 120.

When the support bracket 120 is a corner bracket, the side wall members 110 are formed at a substantially right angle.

The support bracket 120 can be formed of any number of different materials including plastics and in particular, the support bracket 120 can be a single molded piece of plastic (e.g., injection molded piece).

It will be appreciated that any number of other support brackets can be used to couple together the side wall members 110 to form the assembled unit so long as the support bracket includes an opening or the like for receiving and securely holding a vertical support member 200 that is part of the lighting system.

The hollow interior channel or bore 142 provides a receptacle for support member 200 that are part of the lighting system according to the present invention and as described below. The vertical support member 200 is an upstanding structure that can be located in one or more corners of the assembly or can also be formed along an intermediate location of one or more of the side wall members 110. The shape of the support member 200 and the bore 142 can be keyed to permit insertion in one orientation and prevent rotation of the support member 200, etc.

Figure 9:
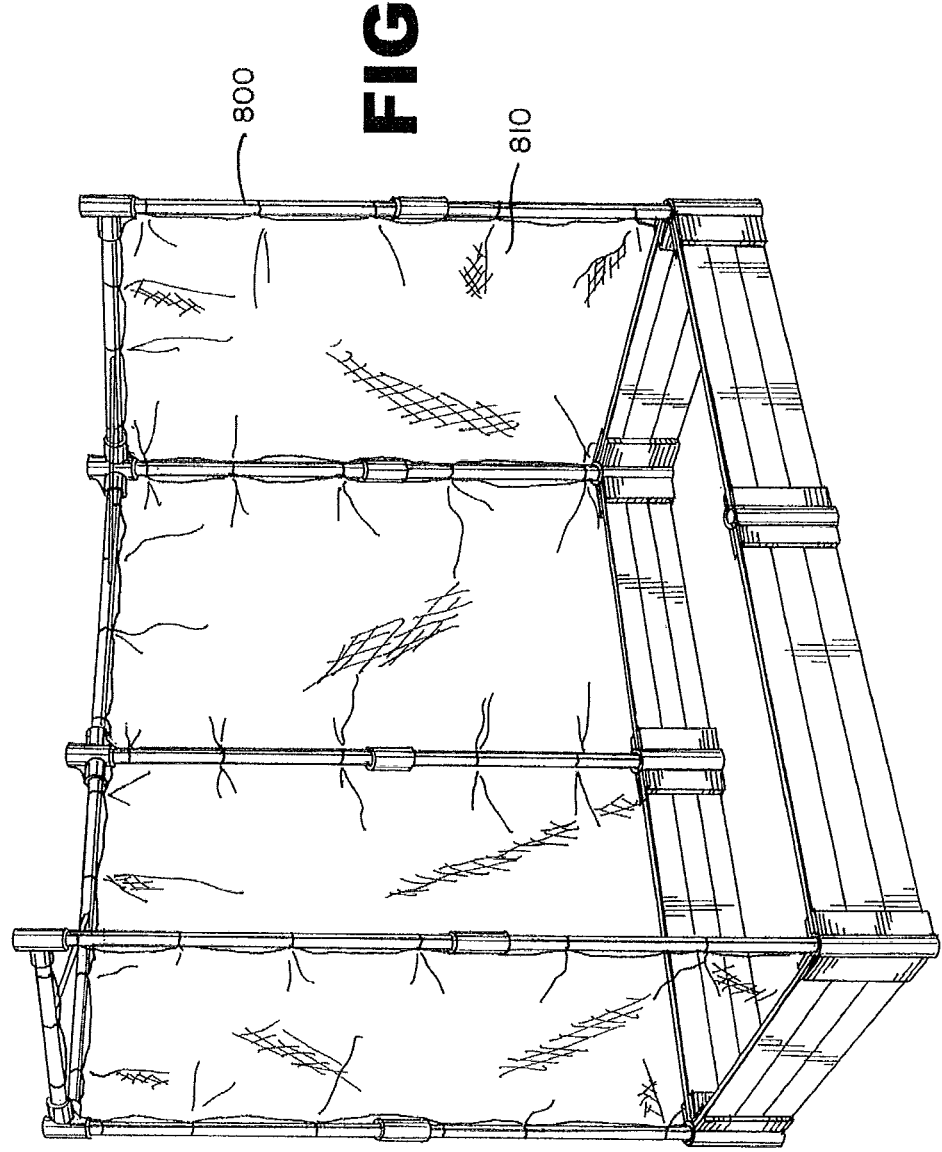

It will be appreciated that the raised border arrangement shown in FIG. 1 is merely exemplary and other frames and arrangements are equally possible. For example, FIGS. 8 and 9 show an alternative frame 700 for a raised bed border including optional netting 710 that is an animal barrier and/or veggie wall. It will be appreciated that the lighting system discloses herein can be easily implemented into the frame construction shown in FIGS. 8 and 9.

The support member 200 is in the form of an elongated structure such as an upstanding rod or tubular structure. In accordance with one embodiment, the support member 200 supports a light unit (device) of the lighting system in an adjustable manner. In the illustrated embodiment, the lighting system includes a tension wire (cord) device 310 or the like that includes an extendable and retractable tension wire, cord, rope, etc., 320 that has a first (distal) end 322 and an opposing second end 324. For illustrative purposes only, the member 320 is described as being a tension wire; however, it will be understood that it is not limited to such construction and can be in the form of a rope or cord, such as ones formed of synthetic materials, etc. The first distal end 322 is associated with one support member 200 and the other end 324 is associated with another support member 200. The wire 320 is preferably held under tension so as to provide a wire that is free of sagging, etc., along its length.

Any number of different techniques can be used to extend and couple the distal end 322 of the wire 320 to the different support structures, such as the support member 200. For example and as shown in FIGS. 1 and 2, the end 322 can include a connector 330, such a clip or clamp mechanism or the like, to couple and securely attach the wire 320 to the support structure, such as the support member 200. For example, the connector 330 can be a clip or other type of fastener, such as a carabiner, etc., which is configured to attach the distal end 322 to another structure, such as a coupling member that is associated with another support member 200 as described below. In the illustrated embodiment, the connector 330 includes an openable gate 331 that can be spring loaded or simply naturally biased against the remaining portion of the connector 330 to complete and close off the connector 330 structure.

In accordance with the present invention, the connector 330 can include a wire securing element 350 that permits the connector 330 to also be secured to another wire as described below with reference to FIG. 7.

To apply tension to the wire 310, the device 310 is designed to apply tension to the wire 320. As best shown in FIGS. 2-4, the device 310 is in the form of a wire tensioning unit that has a housing 360 with a hollow interior that stores the wire 320. In particular, the device 310 has a construction in which the wire 320 is wound about a winder or spool structure 371 that is contained within the housing 360. The spool structure includes a center axle 370 that can be biased (with spring 372) in one direction and more specifically, the center axle 370 is biased in a direction that normally results in the wire 320 being wound about the center axle 370. The second end 324 of the wire 320 is attached to the spool 371. Thus, without a force being applied to the wire 320 in a direction away from the housing 360, the wire 320 remains wound about the center axle 370. The housing 360 includes an exit in the form of an opening/slot 385 through which the first end 322 of the wire 320 extends. The connector 330 at the distal end 322 of the wire 320 has a size greater than the opening/slot 385 and therefore, the first end 322 is prevented from being accidentally withdrawn into the housing 360. The connector 330 is attached to the distal end 322 using any number of means, including mechanical attachment.

The device 310 thus operates as a tensioning device and can include a winder or spool structure with a locking member, such as a clutch, that allows the user to apply tension to the wire by winding the wire 320. Alternatively, the device 310 cannot include such a locking member and the tension cord is under constant tension as a result of the applied biasing force and thus, if the user releases the pulled cord, the cord will automatically wind about the center shaft within the housing. In this embodiment, the user simply pulls the cord to a distance needed to attach the first connector 330 at the distal end thereof to another structure.

The wire 320 is stored in the housing 360 in a wound state. As the wire 320 is pulled outward of the slot 385, the wire 320 is released and unspooled due to the user overcoming the biasing force. However, the biasing member (such as a spring) within the housing 360 causes the unspooled wire 320 to be under tension due to a force being applied to the spool about which the wire 320 is wound.

The housing 360 includes a portion that is configured to couple and mate with the support member 200. For example and as shown in FIG. 3, the housing 360 can include a protrusion 375 (finger or nub) or the like that is received within the open end of the support member to securely couple the two together. As shown in FIG. 3, the protrusion 375 extends downwardly from the bottom of the housing 360 and mates with a light unit coupling member 400 that is coupled to the top of the support member 200. The coupling member 400 is in the form of a cap that mates with the top end of the support member 200. The coupling member 400 has a cap-like body 410 (e.g., cylindrical shape when the support member 200 is round) that includes a top connector section 420 that is complementary to and constructed to mate with the protrusion 375. For example, any number of types of mechanical attachments can be used to connect the housing 360 to the coupling member 400. In the illustrated embodiment, the protrusion 375 is a threaded fastener that mates with a threaded opening 422 in the top connector section 420. The unit 310 is simply screwed on the top connector section 420.

The coupling member 400 and in particular, the body 410 thereof, can be attached to the top of the support member 200 using conventional techniques, including the use of a fastener or other mechanical attachment means, such as a snap-fit. In the illustrated embodiment, the body 410 includes a fastener 425 on a side wall thereof which can be rotated to cause the inner end to contact and seat against the support member 200 that is contained within the body 410. For example, the user screws the fastener 425 into engagement with the underlying support member 200 to provide a secure attachment between the coupling member 400 and the support member 200. Other attachment means, such as a snap-fit, can likewise be used to attach the support member 200.

As will be appreciated, once attached to the support member 200, the wire 320 can be withdrawn therefrom by grasping the free distal end 322 and pulling it away from the housing 360 in a direction toward an intended point of attachment, such as across to another support member. As shown in FIGS. 1 and 5, the top end of the support member 200 can include a different type of coupling member 500 that, while similar to the coupling member 400, is intended to attach to the connector 330 at the end 322 of the wire 320 as opposed to supporting a wire tensioning device.

The coupling member 500 is in the form of a cap that mates with the top end of the support member 200. The coupling member 500 has a cap-like body 510 (e.g., cylindrical shape when the support member 200 is round) that includes a top connector section 520 that includes a structure 522 that is constructed to engage the connector 330. In the illustrated embodiment, the structure 522 is in the form of an open ring (which can have a degree of movement) that extends upwardly. The connector 330 (e.g., a clip, carabiner, etc.) mates with the ring 522 by first opening up the connector 330 and slipping the ring 522 into the center opening of the connector 330 and then releasing the openable part (gate 331) of the connector 330. To detach the connector 330 from the ring 552, the steps are reversed. The wire 320 that is extended between the unit 310 and the ring 552 is under tension as a result of the active biasing mechanism in the unit 310 that is applying a winding force on the wire 320 in the direction in which the wire 320 is wound around the center spool, etc.

It will also be appreciated that the housing 360 can contain a ring or hook member, such as ring 552, to permit attachment of the free end 322 of the wire 320 that is extended from another device 310. In this embodiment, the location of the ring 552 is such that it does not interfere with the extension and retraction of the wire or cord 320. For example, the ring 552 can extend outwardly from a side of the housing 360 spaced from the slot 385.

It will also be appreciated that the end 322 of the wire 320 can be attached to a structure other than the support member 200. For example, the end 322 of the wire 320 can be attached to a wall or the like that may be proximate to the assembled raised border system 100 as shown in FIG. 2. In FIG. 2, the unit 310 also includes a second fastening element 315 that is located at the rear of the housing 360 opposite to the slot 385. The second fastening element 315 is not associated with an extendable member but instead is merely fixedly attached to the housing 360. The second fastening element 315 can be in the form of a clip, similar to connector 330, that attaches to a coupling member 395 that is associated with a support structure, such as a wall or the like. As shown in FIG. 2, the coupling member 395 can be in the form of a ring 397 that is attached to a base or plate 399 that is fixedly attached to the wall or other support structure. The coupling between the ring 397 and the base 399 can be such that the ring 397 can pivot, etc.

The unit 310 is thus secured to the wall (support structure) and the cord/wire 320 is extended and attached to another structure, such as a support member 200 of the system. As in the other embodiment, the wire 320 is under tension.

The arrangement of FIG. 2 illustrates that the lighting system of the present invention can be implemented in an indoor setting, such as a greenhouse or a garden window, or even in an indoor room in which gardening is present (e.g., a hydroponic garden). In other words, the tension cord network described herein can be implemented in an indoor setting to allow suspension of lighting units to provide glow lights to indoor plants.

In addition, the end 322 of the wire 320 can be attached to another wire 320 as shown in FIGS. 1 and 7. As shown in FIG. 1 and described above, the connector 330 includes the wire securing element 350 that permits the connector 330 to also be secured to another wire as described below with reference to FIG. 7. As shown in FIG. 7, the wire securing element 350 can be in the form of a fastener 352, such as a screw, that can be manipulated to apply a head 354 thereof into contact with the wire 320. For example, the fastener 352 is in the form of a screw that can be driven toward the clip body and the head 354 can be a rounded head that is driven into contact with the wire 320 so as to securely capture the wire 320 by a pinching action. In other words, the wire 320 is captured between the fastener 352 and the connector 330, thereby resulting in the connector 330 being securely attached to the wire 320. To release the wire 320, the fastener 352 is rotated in the other direction to release the wire 320 from being pinched. As shown, the mechanism 350 does not interfere with the opening action of the gate 331.

Instead of a threaded fastener 352, the mechanism 350 can be in the form of a biased pin or the like that applies a force to the first tension wire (cord) 320 to securely attach the connector 330 thereto.

It will be appreciated that the connectors shown herein are merely exemplary in nature and any number of other types of connectors can be used to provide the various attachments between the various components of the present system.

To reposition the connector 330 along the wire 320, the fastener 352 is simply loosed and the connector 330 is moved to the new target location along the wire 320 and then the fastener 352 is tightened.

It will be appreciated that the construction shown in FIG. 7 allows the tension wire 320 to be attached to another tension wire 320 as opposed to requiring it to be attached at its end to one of the support members 200. As shown in FIG. 1, this permits a tension wire 320 to be strung along a target location of the raised bed without requiring that the tension wire 320 terminate at the perimeter of the raised bed where the frame members are present. This provides greater versatility as described hereinafter in terms of providing a tension wire grid or network that can support the lighting units of the present invention. The light unit can thus be disposed along the tension wire 320 between its connection point with the tension wire 320 and the housing of the device 310.

In accordance with the present invention, the tension wire grid that is constructed using the components described above to create one or more tension wires strung across the raised bed at locations where it is desirable to hang light units 600.

One exemplary light unit 600 is illustrated in FIGS. 1 and 6 and is formed of a number of parts that allow the light unit 600 to be securely attached to the wire 320 at a target location therealong and also allows the vertical position of the light source to be varied.

For example, the light unit 600 can include a light source 610 which can be in the form of a light lamp or the like. The light source 610 includes a housing 620 that stores a light element in the form of a grow light. As mentioned hereinbefore, grow lights can take any number of different forms, including newer LED lights that are constructed to use high-brightness multiple-watt LEDs, with growing results similar to HID lights.

In one embodiment, the light source 610 is in the form of an LED grow light that contains a plurality of LEDs. As technology advances, newer LED grow lights are capable of consuming only 80 watts of power and producing virtually no heat. These LED grow lights boast light intensity and growth rates exceeding that of a 400 W HPS (high pressure sodium lamp). The LED lamp can use highly efficient 1 watt LEDs, can use only the exact spectrums required for photosynthesis, and can use wide angle directional bulbs. The 1 watt LED is one of the most efficient light sources in the world (lumens per watt). By using only the spectrum required, no light is wasted in the spectrums of light that do little or nothing for a plants growth—such as green light. Lastly the directional LEDs ensure 100% of the light is pointed downwards—they do not rely upon reflective materials to direct the light. Benefits of LED grow lights include:—Greatly reduced power consumption—Less Heat Generated—Ideal for all phases of plant growth—No setup required—Less Pollution—Extremely long life—80,000+ hours The LED lamp is many times over the highest powered LED grow light available. It can be used by itself for all cycles of plant growth (covers 9 square feet), can be combined with outer lighting, such as fluorescent lighting.

In one embodiment, the light source 610 is of a solar type in that the light source 610 includes a solar panel 625 that is disposed along the exterior of the housing 620 and is operatively connected to a power source (e.g., batteries) contained in the housing 620. The light unit 600 includes a controller in the form of a processor and user interface, such as a control panel 621 or the like that allows the user to make certain selections, such as turning the unit on or off, selecting an operating mode, such as the illumination time period or an auto illumination feature in which the light unit 600 turns on at dusk or conditions that emulate dusk, etc. As is known, a photosensor can be used in such auto illumination mode to detect the degree of natural sunshine. The controller can also include a timer feature to allow the user to program the start and end times for the individual lights. In this manner, the light units 600 can be programmed based on the specific needs of the living object being illuminated and therefore, some plants can be illuminated for a longer time, etc.

The light source 610 and in particular, the housing 620 thereof, is supported by a member 640 that is similar to member 310 and in particular, the member 640 is constructed such that it has an extendable/retractable cord or wire 645 that is stored in a housing 650 and extends through a slot or opening 655 formed therein. The housing 650 can take any number of different forms including a circular structure as shown. The housing 650 has a closed top end 653 and a bottom end 657 that includes the slot 655. Within the housing 650, the cord or wire 645 is stored in a wound state. For example, a central axis or shaft 649 is contained within the housing 650 and one end of the cord or wire 645 is attached to a spool 671 that is biased with spring 672 and is contained in the housing 650. As with the previous embodiment, the central shaft 649 is biased in a direction that results in the cord 645 being wound to a retracted position due to a proximal end 647 being attached to the shaft 649.

A distal end 651 of the wire 645 is attached to a coupling member 660 that is itself coupled to the housing 650. The coupling member 660 is in the form of a ring and the distal end 651 of the wire 645 includes a connector, such as connector 330.

The housing 650 (and housing 360) can include a lock mechanism, such as button 680, that allows the user to lock the wire 645 in place. For example, the user pulls the wire 645 to a desired length and then activates the lock mechanism 680 to lock the wire 645 in place. The button 680 can also be used to release the lock and permit the wire 645 to be either extended or retracted to another target length. The lock mechanism can thus be in the form of a clutch type mechanism.

The top end 653 of the housing 650 includes a coupling member 690, such as a ring or the like. The coupling member 690 is attached to a connector 330. The connector 330 includes the wire securing element 350 that permits the connector 330 to also be secured to wire 320 as described below with reference to FIG. 1. Thus, as shown in FIG. 1, the light unit 600 is constructed such that the location of the light source 610 can be varied depending upon a number of different considerations including the location of the target plants within the raised bed system 100. For example, for seedlings, small plants or sprouting bulbs, the light source 610 should be lowered so as to be close to the target object. As the plants grow, the light source 610 can be periodically raised so as to position the light source 610 at the optimal location.

According to the inverse-square law, the intensity of light radiating from a point source (in this case a grow light bulb) that reaches a surface is inversely proportional to the square of the surface's distance from the source (if an object is twice as far away, it receives only a quarter the light). Plants or lights are moved as close together as possible so that they receive equal lighting and that all light coming from the lights falls on the plants rather than on the surrounding area. In one arrangement, the distance between light and plant is between about 4 inches and 3 feet and more particularly, between 4 inches and 24 inches or between 4 inches and 15 inches or between 4 inches and 10 inches or between 1 inch and 12 inches, etc. The precise target distance will vary depending upon a number of parameters including but not limited to the type of plant, the time of year, etc. In any event, one of the advantages of the present invention is the ease at which the light source 610 can be positioned relative to the target plant by simply manipulating the member 640 to either provide additional cord 320 or to retract the cord 320, thereby changing the position of the light source 610 relative to the plants.

It will be appreciated that the light source 610 is not limited to being of a solar type and instead, the light source 610 can be powered by other means, including batteries or other energy source, that permits the light unit 600 to be disposed and maintained at an outdoor location exposed to the elements, such as rain, etc. When the raised bed system 100 is inside such as being in a greenhouse or the like, then the light source 610 can be even powered using a traditional electrical outlet since it will not come into contact with adverse elements, such as rain.

It will be appreciated that the present invention provides a means to create a tensioned wire network that can be customized so as to string tension wires/cords over the target areas of the raised bed arrangement 100 to permit one or more grow light units 600 to be strategically hung for providing supplemental light to target objects within the raised bed arrangement 100 such as plants, etc. The position of the grow light units 600 can be easily changed along the tension cord by simply disengaging the light unit 600 and then moving the unit 600 to the desired location at which the light unit 600 is then locked back in place.

Figure 10:
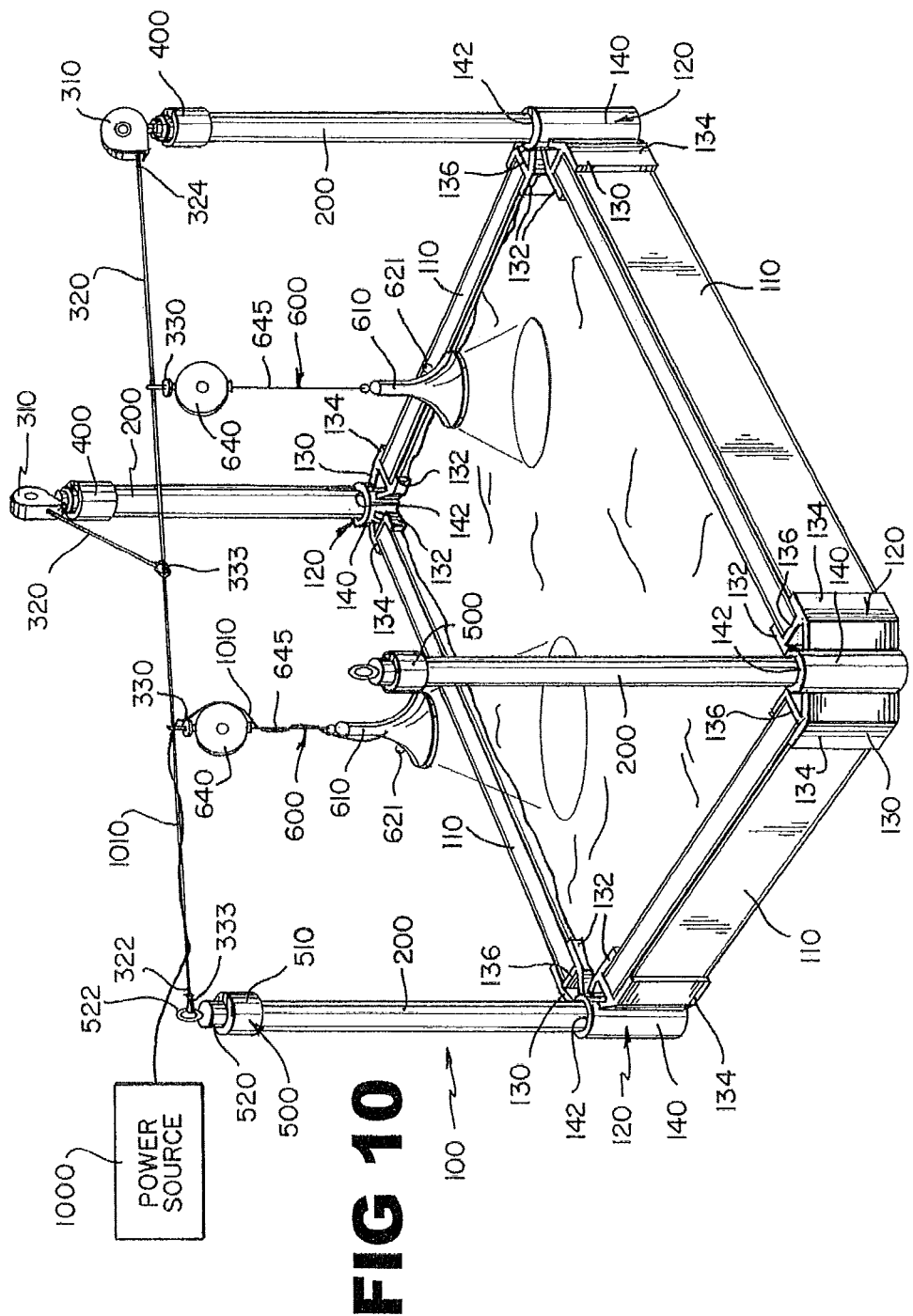
FIG. 10 is a perspective view of a raised border system showing a solar lighting system according to another embodiment of the invention.

FIG. 10 shows another alternative embodiment in which the tension cord network provides a means for carrying power to the light unit 600. In particular, when the light unit 600 is powered by an external power source 1000, one or more electrical cables 1010 can be routed along the tension cord network to the light unit 600.

It will be appreciated that the power source 1000 can be in the form of an electrical power supply or can be in the form of a solar based power supply in which solar panels can be provided outside of and remote to (e.g., adjacent) the raised bed system and connected via cables 1010 to the light unit 600. When the power source is solar based, one or more large solar panels can be fixed to the ground or other support structure (e.g., by using a stake) and then connected to the light unit 600 to allow a power source (batteries) that are in the housing 620 of the light unit 600 to be charged. The cable 1010 can be plugged into a jack formed in the housing 620 to electrically connect the batteries in the light unit 600 with the power source 1000.

Ties or other connectors can be used to releasably attach the cable 1010 to the tension cord network.

The present tension cord network can be formed using other connectors at the ends of the tension cord so long as the tension cord is hung in a suspended manner over the raised bed area. The rotation of the devices 310 permits the tension cord to be extended in any number of different directions over the raised bed area; however, the devices 310 do not have to rotate and can be more of a fixed or static unit. In addition, the support members 200 can be adjustable also in that they can be telescoping members or otherwise have a mechanism to adjust the height thereof. This also permits the height of the tension cord network to be adjusted relative to the ground (raised bed).

It is also within the scope of the present invention that other devices can be used to controllably position the light units 600 at target locations and at target heights relative to the ground. For example, other cord winders can be used that allow a length of cord to be pulled from the winder.

It will also be understood that the tension cord devices disclosed herein can be specifically constructed to provide sufficient tension such that the weight of the light units 600 does not cause significant sagging of the tension cord. One or more light units 600 can thus be supported by the tension cord.

The invention is described in detail with reference to a particular embodiments thereof, but the scope of the invention is to be gauged by the claims that follow and also by those modifications that provide equivalent features to those that are claimed as such modifications are still within the spirit and scope of the invention.

What is claimed is:

1. A grow light system for use in a raised bed arrangement that includes a frame having a plurality of side wall parts mated together with coupling members, the grow light system comprising:
a plurality of vertical support members configured to mate with the coupling members resulting in the vertical support members being upstanding members of the frame;
at least one first tension cord device that includes a first housing which stores a first tension cord that has a biasing force applied thereto and can be extended from the first housing and retracted back into the first housing due to the applied biasing force, wherein a distal end of the first tension cord includes a first connector and the first tension cord device is configured to mate with and be securely supported by one vertical support member of the plurality of vertical support members, wherein extension of the first tension cord and attachment of the first connector to a structure results in the first tension cord being under tension and suspended over the raised bed arrangement;
a grow light unit having a light source contained within a light housing; and
at least one second tension cord device that includes a second housing which stores a second tension cord that has a biasing force applied thereto and can be extended from the second housing and retracted back into the second housing due to the applied biasing force, the second tension cord device having a mechanism that allows the second tension cord to be placed in a locked position where a predetermined length of the second tension cord extends from the second housing, wherein a distal end of the second tension cord is coupled to the light housing of the grow light unit, the second tension cord device permitting the grow light to be positioned at a predetermined location at a preselected distance from an object in the raised bed arrangement, wherein the second tension cord device is coupled to the first tension cord such that it is suspended therefrom.

2. The grow light system of claim 1, wherein the first tension cord is wound around a center shaft within the first housing of the first tension cord device, the center shaft being biased in a direction that results in the first tension cord being wound about the center shaft.

3. The grow light system of claim 1, wherein the first tension cord device has a mechanism that allows the first tension cord to be placed in a locked position with a predetermined length of the first tension cord extending from the first housing.

4. The grow light system of claim 1, wherein the first connector comprises a clip that is openable and biased to a closed position.

5. The grow light system of claim 4, wherein the clip includes a cord securing fastener for pinching the second tension cord within the clip to securely attach the clip to the second tension cord.

6. The grow light system of claim 5, wherein the cord securing fastener comprises a screw with an enlarged contoured head for seating against the second tension cord, thereby securing the second tension cord in place within the first connector.

7. The grow light system of claim 1, wherein the first tension device is rotatably attached to the one vertical support member of the plurality of vertical support members.

8. The grow light system of claim 1, further including a first coupling member supported on a top end of the one vertical support member of the plurality of vertical support members, the first tension cord device having a first connector section that mates with a second connector section that is part of the first coupling member.

9. The grow light system of claim 8, wherein the first connector section comprises a male member and the second connector section comprises a female member that receives the male member to attach the first tension cord device to the one vertical support member of the plurality of vertical support members.

10. The grow light system of claim 8, wherein the first connector section comprises a female member and the second connector section comprises a male member that receives the male member to attach the first tension cord device to the one vertical support member of the plurality of vertical support members.

11. The grow light system of claim 1, wherein the light source emits only wavelengths of light corresponding to absorption peaks of a plant's typical photochemical processes.

12. The grow light system of claim 1, wherein the light source comprises an LED based light source.

13. The grow light system of claim 12, wherein the light source comprises an LED lamp having a plurality of LEDs that are operatively connected to a power source and a controller, the power source being operatively connected to a solar panel for charging the power source.

14. The grow light system of claim 13, wherein the power source comprises batteries.

15. The grow light system of claim 1, wherein the second tension cord is wound around a center shaft within the second housing of the second tension cord device, the center shaft being biased in a direction that results in the second tension cord being wound about the center shaft, the second tension cord passing through a slot at a bottom of the second housing of the second tension cord device, while a top of the second tension cord device includes a second connector that is constructed to be securely attached to the first tension cord such that it is suspended therefrom.

16. The grow light system of claim 15, wherein the first and second connectors are the same type.

17. The grow light system of claim 15, wherein the second connector comprises a clip and a cord securing fastener for pinching the first tension cord within the clip to securely attach the clip to the first tension cord.

18. The grow light system of claim 17, wherein the cord securing fastener comprises a screw with an enlarged contoured head for seating against the first tension cord, thereby securing the first tension cord in place within the second connector.

19. The grow light system of claim 1, wherein the mechanism of the second tension cord device comprises a clutch that locks the second tension cord.

20. A raised bed border kit comprising:
a frame including a plurality of side wall parts mated together with frame coupling members to form an upstanding modular raised bed frame, the frame including a plurality of vertical support members that mate with the coupling members resulting in the vertical support members being upstanding members that extend upwardly from the frame coupling members above the plurality of side wall parts, and
a grow light system comprising:
at least one first tension cord device that is disposed on one vertical support member of the plurality of vertical support members, the first tension cord device including a first housing which stores a first tension cord that has a biasing force applied thereto and can be extended from the first housing and automatically retracted back into the first housing due to the applied biasing force, wherein a distal end of the first tension cord includes a first connector for attaching the first tension cord to another structure resulting in the first tension cord being under tension and suspended over a raised bed garden area defined between the frame; and
a grow light unit having a light source contained within a light housing, wherein the grow light unit is securely attached to the first tension cord such that the grow light unit is suspended therefrom over the raised bed garden area.

21. The raised bed border kit of claim 20, wherein the grow light unit is attached to the first tension cord by a second tension cord device that includes a second housing which stores a second tension cord that has a biasing force applied thereto and can be extended from the second housing and retracted back into the second housing due to the applied biasing force, the second tension cord device having a mechanism that allows the second tension cord to be placed in a locked position where a predetermined length of the second tension cord extends from the second housing, wherein a distal end of the second tension cord is coupled to the light housing of the grow light unit, the second tension cord device also being coupled to and suspended from the first tension cord, thereby permitting the grow light to be positioned at a predetermined location at a preselected distance from an object in the raised bed garden area.

22. The raised bed border kit of claim 20, wherein the light source emits only wavelengths of light corresponding to absorption peaks of a plant's typical photochemical processes.

23. The raised bed border kit of claim 22, wherein the light source comprises an LED based light source.

* * * * *